(12) United States Patent  
Ikenaka et al.

(10) Patent No.: US 7,330,406 B2
(45) Date of Patent: Feb. 12, 2008

(54) OPTICAL PICKUP DEVICE AND OPTICAL ELEMENT USED FOR THE SAME

(75) Inventors: Kiyono Ikenaka, Hino (JP); Mitsuru Mimori, Kokubunji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 11/702,191

(22) Filed: Feb. 5, 2007

(65) Prior Publication Data

US 2007/0133375 A1  Jun. 14, 2007

Related U.S. Application Data

(63) Continuation of application No. 10/647,456, filed on Aug. 26, 2003, now Pat. No. 7,200,079.

(30) Foreign Application Priority Data

Aug. 30, 2002 (JP) ............................. 2002-252986
Sep. 30, 2002 (JP) ............................. 2002-285515

(51) Int. Cl.
 *G11B 7/00* (2006.01)
(52) U.S. Cl. ............................. 369/44.37; 369/112.01; 369/112.23; 369/44.23
(58) Field of Classification Search ............. None
See application file for complete search history.

(56) References Cited

U.S. PATENT DOCUMENTS

| 2002/0159377 A1 | 10/2002 | Saito et al. |
| 2003/0058776 A1 | 3/2003 | Sakamoto |
| 2005/0281169 A1 | 12/2005 | Kimura et al. |
| 2006/0039266 A1 | 2/2006 | Kimura et al. |

*Primary Examiner*—Muhammad Edun
(74) *Attorney, Agent, or Firm*—Finnegan, Henderson, Farabow, Garrett & Dunner, L.L.P.

(57) ABSTRACT

An optical pickup device, comprises light sources to emit a first light flux having a wavelength $\lambda 1$ (380 nm<$\lambda 1$<450 nm); a second light flux having a wavelength $\lambda 2$ (600 nm<$\lambda 2$<700 nm); and a light-converging optical system. The light-converging optical system converges the first light flux on a first optical information recording medium through a protective layer having a thickness t1 and the light-converging optical system converges the second light flux on a second optical information recording medium through a protective layer having a thickness t2. The light-converging optical system forms a first spot on the information recording surface of the first optical information recording medium by using N-th order diffracted light ray generated, and the light-converging optical system forms a second spot on the information recording surface of the second optical information recording medium by using M-th order (M≠N) diffracted light ray generated.

7 Claims, 3 Drawing Sheets

OPTICAL PICKUP DEVICE AND OPTICAL ELEMENT USED FOR THE SAME

CROSS-REFERENCE TO RELATED APPLICATIONS

This is a continuation application of U.S. patent application Ser. No. 10/647,456, filed Aug. 26, 2003, now U.S. Pat. No. 7,200,079, the entirety of which is incorporated herein by reference. This application also claims the benefits of priority of Japanese Patent Application No. 2002-252986, filed Aug. 30, 2002, and Japanese Patent Application No. 2002-285515, filed Sep. 30, 2002.

BACKGROUND OF THE INVENTION

The present invention relates to an optical pickup device and an optical element used for the optical pickup device, and in particular, to an optical pickup device capable of recording and/or reproducing information by the use of a violet laser or lasers other than the violet laser and to an optical element used for the optical pickup device.

Backed by practical application of a short wave red semiconductor laser, there has recently been developed and commercialized DVD (digital versatile disk) representing a high density optical disk which is similar to CD (compact disk) representing a conventional optical disk (also called an optical information recording medium) in terms of a size and has a greater capacity, and it is estimated that an advanced optical disk having higher density will appear in the near future. In the light-converging optical system of an optical information recording and reproducing apparatus (also called an optical pickup device) wherein such advanced optical disk is a medium, a diameter of a spot converged on an information recording surface through an objective lens is required to be small, for the purpose of achieving higher density of recording signals, or for reproducing higher density recording signals. For that purpose, a short wavelength of a laser representing a light source and a higher numerical aperture of the objective lens are required. What is expected in terms of practical use as a short wavelength laser light source is a violet semiconductor laser with a wavelength of about 400 nm.

There have been advanced studies and developments of a high density disk system capable of conducting recording/ reproducing by the use of this violet semiconductor laser with a wavelength of about 400 nm. As an example, in the case of the optical disk conducting recording/reproducing information under the specifications of NA 0.85 and wavelength of 405 nm (hereinafter referred to as "high density DVD" in the specification), information of 20-30 GB per one surface can be recorded for the optical disk having a diameter of 12 cm which is the same as DVD (NA 0.6, light source wavelength 650 nm, storage capacity 4.7 GB) in size.

When an objective lens having high NA is made to be a plastic lens in an optical pickup device for high density DVD, there is generated spherical aberration caused by changes in the refractive index resulting from temperature changes, which is a problem. The problem of this kind is caused by a plastic lens which is greater than a glass lens by magnifying power of a two-digit number in terms of a change of the refractive index resulting from temperature changes. Since this temperature aberration is proportional to the fourth power of NA, when an objective lens having NA of 0.85 to be used for high density DVD is made to be a plastic lens, a range of temperatures which can be used for that lens is reduced to be extremely narrow, which is a problem for the practical use of the lens. Further, since a semiconductor laser originally causes a wavelength fluctuation phenomenon which is called a mode hop, it is necessary to control aberration in a converging spot on an information recording surface, even when a mode hop is caused. In addition, there is generally dispersion of oscillation wavelength between individuals of a semiconductor laser, and even in the case of a combination of semiconductor lasers having dispersion to a certain extent and objective lenses, it is necessary to form a converging spot which is appropriate to a level that makes recording/reproducing of information possible. For that purpose, spherical aberration caused by fluctuations of light source wavelength needs to be controlled by some methods or other.

Further, value of the optical pickup device as a product is not sufficient if the optical pickup device cannot conduct more than recording/reproducing information properly for high density DVD. When considering that DVDs having therein various types of information recorded are on the market presently, recording/reproducing information properly for high density DVD only is not enough, and the value of the product as an optical pickup device of an interchangeable type is enhanced, by achieving that recording/reproducing of information can equally be conducted properly for conventional DVDs owned by, for example, a user. From the background mentioned above, it is necessary, with respect to a light-converging optical system used for an optical pickup device of an interchangeable type, to control properly all of aberration deterioration caused by temperature changes, aberration deterioration caused by wavelength fluctuations and aberration deterioration in the case of a mode hop (or chromatic aberration), on the converging spot formed on the information recording surface when recording/reproducing information for high density DVD, and it is necessary to control properly all of aberration deterioration caused by temperature changes, aberration deterioration caused by wavelength fluctuations and aberration deterioration in the case of a mode hop (or chromatic aberration), on the converging spot formed on the information recording surface when recording/reproducing information for conventional DVD. However, it is extremely difficult to satisfy a plurality of aberration conditions with a single light-converging optical system. Nevertheless, if two light-converging optical systems each having an objective lens are provided for converging a violet laser beam and a conventional laser beam separately, an optical pickup device is made to be large in size, and its cost is increased, which is a problem. Incidentally, the structure for converging a violet laser beam and a conventional laser beam with a single light-converging optical system is disclosed in the following patent document, but there is no disclosure about a design to consider temperature characteristics and wavelength characteristics.

(Patent Document 1)

SUMMARY OF THE INVENTION

The invention has been achieved in view of the problems mentioned above, and its object is to provide an optical pickup device which has a compact structure and yet is capable of conducting recording and reproducing of information properly for high density DVD or for both the high density DVD and a conventional DVD, and to provide an optical system which can be used for the optical pickup device.

The optical pickup device described in Item 1 is represented by an optical pickup device that has therein a first light source having wavelength λ1 (380 nm<λ1<450 nm), a second light source having wavelength λ2 (600 nm<λ2<700 nm) and a light-converging optical system having a light-converging optical element including a diffractive structure and a correcting element arranged between the first light source and/or the second light source and the light-converging optical element, and is capable of conducting recording and/or reproducing information when the light-converging optical system converges a light flux emitted from the first light source on an information recording surface of the first optical information recording medium through a protective layer having thickness t1, and is capable of conducting recording and/or reproducing information when the light-converging optical system converges a light flux emitted from the second light source on an information recording surface of the second optical information recording medium through a protective layer having thickness t2, wherein the first spot is formed on the information recording surface of the first optical information recording medium by the use of N-th order diffracted light that is generated when a light flux from the first light source passes through the diffractive structure of the light-converging optical system, and the second spot is formed on the information recording surface of the second optical information recording medium by the use of M (M≠N)-th order diffracted light that is generated when a light flux from the second light source passes through the diffractive structure of the light-converging optical system, while, spherical aberration deteriorated by wavelength changes in the first light source and spherical aberration deteriorated by temperature changes are controlled to be in a range necessary for recording and/or reproducing of information on the first spot formed on the information recording surface of the first optical information recording medium, and spherical aberration deteriorated by wavelength changes in the second light source and spherical aberration deteriorated by temperature changes are controlled to be in a range necessary for recording and/or reproducing of information on the second spot formed on the information recording surface of the second optical information recording medium. Namely, in view of the actual circumstances that it is difficult for a single light-converging optical element to form a converging spot that is free from aberration deterioration on each condition, for both of the light flux from the light source with wavelength λ1 and a light flux from the light source with wavelength λ2, the diffractive structure on the light-converging optical element and the correction element are used in the invention to control each aberration deterioration in a well-balanced way, thus, recording and/or reproducing of information is conducted properly for both of the high density DVD and the conventional DVD. Incidentally, as stated later, the correction element includes an occasion to make only the light flux emitted from the first light source to pass, an occasion to make only the light flux emitted from the first light source to pass and an occasion to make light fluxes emitted from both light sources to pass respectively.

In the optical pickup device described in Item 2, chromatic aberration of the converging spot caused by changes in a wavelength of a light source is controlled to be within a range necessary for recording and/reproducing of information in the first spot formed on an information recording surface of the first optical information recording medium, and chromatic aberration of the converging spot caused by changes in a wavelength of a light source is controlled to be within a range necessary for recording and/reproducing of information in the second spot formed on an information recording surface of the second optical information recording medium, thus, the optical pickup device can conduct recording and/or reproducing of information properly for both a high density DVD and a conventional DVD, for example.

In the optical pickup device described in Item 3, it is preferable that t1 representing a thickness of a protective layer of the first optical information recording medium and t2 representing a thickness of a protective layer of the second optical information recording medium satisfy the following expressions.

$$0.5 \text{ mm} \leq t1 \leq 0.7 \text{ mm} \tag{1}$$

$$0.5 \text{ mm} \leq t2 \leq 0.7 \text{ mm} \tag{2}$$

It is preferable for the optical pickup device described in Item 4 that the aforementioned diffractive structure is provided on the area through which light fluxes pass commonly when conducting recording and/or reproducing of information for the first optical information recording medium and the second optical information recording medium, in a part of at least one optical surface of the light-converging optical element, diffraction efficiency of 3m-th (m represents a positive integer, and so forth) order diffracted light becomes higher than diffraction efficiency of another order diffracted light generated when a light flux emitted from the first light source passes, and diffraction efficiency of 2m-th order diffracted light becomes higher than diffraction efficiency of another order diffracted light that is generated when a light flux emitted from the second light source passes.

It is preferable for the optical pickup device described in Item 5 that the aforementioned diffractive structure is provided on the area through which light fluxes pass commonly when conducting recording and/or reproducing of information for the first optical information recording medium and the second optical information recording medium, in a part of at least one optical surface of the light-converging optical element, diffraction efficiency of 8p-th (p represents a positive integer, and so forth) order diffracted light becomes higher than diffraction efficiency of another order diffracted light generated when a light flux emitted from the first light source passes, and diffraction efficiency of 5p-th order diffracted light becomes higher than diffraction efficiency of another order diffracted light that is generated when a light flux emitted from the second light source passes.

It is preferable for the optical pickup device described in Item 6 that the aforementioned diffractive structure is provided on the area through which light fluxes pass commonly when conducting recording and/or reproducing of information for the first optical information recording medium and the second optical information recording medium, in a part of at least one optical surface of the light-converging optical element, diffraction efficiency of 2n-th (n represents a positive integer, and so forth) order diffracted light becomes higher than diffraction efficiency of another order diffracted light generated when a light flux emitted from the first light source passes, and diffraction efficiency of n-th order diffracted light becomes higher than diffraction efficiency of another order diffracted light that is generated when a light flux emitted from the second light source passes.

It is preferable for the optical pickup device described in Item 7 that the correction element is arranged in an optical path through which only the light flux emitted from the first light source passes, or arranged in an optical path through which only the light flux emitted from the second light source passes.

It is preferable for the optical pickup device described in Item 8 that the correction element is arranged in an optical path through which only the light flux emitted from the second light source passes, chromatic aberration of a light convergence spot in the case of a change of a wavelength of a light source on the first spot formed on an information recording surface of the first information recording medium is controlled by the aforesaid light-converging optical element within a range necessary for recording and/or reproducing of information, and chromatic aberration of a light convergence spot in the case of a change of a wavelength of a light source on the second spot formed on an information recording surface of the second information recording medium is controlled by the aforesaid light-converging optical element within a range necessary for recording and/or reproducing of information.

It is preferable for the optical pickup device described in Item 9 that the following expression is satisfied by the number N1 of a diffractive ring-shaped zones existing on an area where light fluxes pass through commonly when conducting recording and/or reproducing information for the first optical information recording medium and the second optical information recording medium, among diffractive structures provided on the light-converging optical element;

$$115/A \leq N1 \leq 155/A \tag{3}$$

(wherein, A represents 3m or 8p which is the order wherein diffraction efficiency in a light flux having wavelength λ1 is higher than that in generated diffracted light having another order).

It is preferable for the optical pickup device described in Item 10 that the correction element has a diffractive structure on at least one optical surface thereof, and the following expression is satisfied by the number N2 of a diffractive ring-shaped zones in the diffractive structure on the correction element;

$$15/k \leq N2 \leq 45/k \tag{4}$$

(wherein, k represents the order wherein diffraction efficiency in a light flux having wavelength λ2 is higher than diffraction efficiency of generated diffracted light having another order).

It is preferable for the optical pickup device described in Item 11 that the diffracting power of the diffractive structure of the correction element is positive.

It is preferable for the optical pickup device described in Item 12 that the correction element is arranged in an optical path through which only the light flux emitted from the first light source passes, chromatic aberration of a light convergence spot in the case of a change of a wavelength of a light source on the first spot formed on an information recording surface of the first information recording medium is controlled by the aforesaid correction element within a range necessary for recording and/or reproducing of information, and chromatic aberration of a light convergence spot in the case of a change of a wavelength of a light source on the second spot formed on an information recording surface of the second information recording medium is controlled by the aforesaid light-converging optical element within a range necessary for recording and/or reproducing of information.

It is preferable for the optical pickup device described in Item 13 that the following expression is satisfied by the number N1 of a diffractive ring-shaped zones existing on an area where light fluxes pass through commonly when conducting recording and/or reproducing information for the first optical information recording medium and the second optical information recording medium among diffractive structures provided on the light-converging optical element;

$$45/A \leq N1 \leq 65/A \tag{5}$$

(wherein, A represents 3m or 8p which is the order wherein diffraction efficiency in a light flux having wavelength λ1 is higher than that in generated diffracted light having another order).

It is preferable for the optical pickup device described in Item 14 that the correction element has a diffractive structure on at least one optical surface thereof, and the following expression is satisfied by the number N2 of a diffractive ring-shaped zones in the diffractive structure on the correction element;

$$30/k \leq N2 \leq 80/k \tag{6}$$

(wherein, k represents the order wherein diffraction efficiency in a light flux having wavelength λ2 is higher than diffraction efficiency of generated diffracted light having another order).

It is preferable for the optical pickup device described in Item 15 that the diffracting power of the diffractive structure of the correction element is negative.

It is preferable for the optical pickup device described in Item 16 that the correction element, is arranged in an optical path through which a light flux emitted from the first light source passes and is arranged in an optical path through which a light flux emitted from the second light source passes.

It is preferable for the optical pickup device described in Item 17 that chromatic aberration of a light convergence spot in the case of a change of a wavelength of a light source on the first spot formed on an information recording surface of the first information recording medium and on the second spot formed on an information recording surface of the second information recording medium is controlled by the light-converging optical element within a range necessary for recording and/or reproducing information, and spherical aberration deteriorated by temperature changes of the first spot formed on an information recording surface of the first information recording medium and of the second spot formed on an information recording surface of the second information recording medium is controlled by the correction element within a range necessary for recording and/or reproducing information.

It is preferable for the optical pickup device described in Item 18 that the following expression is satisfied by the number N1 of a diffractive ring-shaped zones existing on an area where light fluxes pass through commonly when conducting recording and/or reproducing information for the first optical information recording medium and the second optical information recording medium, among diffractive structures provided on the light-converging optical element;

$$144/(2n) \leq N1 \leq 176/(2n) \tag{7}$$

(wherein, 2n represents the order wherein diffraction efficiency in a light flux having wavelength λ1 is higher than that in generated diffracted light having another order).

It is preferable for the optical pickup device described in Item 19 that the correction element has a diffractive structure on at least one optical surface thereof, and the following expression is satisfied by the number N2 of a diffractive ring-shaped zones in the diffractive structure on the correction element;

$$30/k \leq N2 \leq 80/k \tag{8}$$

(wherein, k represents the order wherein diffraction efficiency in a light flux having wavelength λ2 is higher than diffraction efficiency of generated diffracted light having another order).

It is preferable for the optical pickup device described in Item 20 that the diffracting power of the diffractive structure of the correction element is positive.

It is preferable for the optical pickup device described in Item 21 that the following expression is satisfied by focal length f1 of the light-converging optical element relating to a light flux emitted from the first light source.

$$1.8 \text{ mm} \leq f1 \leq 3.0 \text{ mm} \tag{9}$$

It is preferable for the optical pickup device described in Item 22 that the following expression is satisfied by magnification mt wherein the light-converging optical element and the correction element are combined.

$$-1/5 \leq mt \leq -1/10 \tag{10}$$

It is preferable for the optical pickup device described in Item 23 that controlling of spherical aberration deteriorated by fluctuations of the light source wavelength means controlling an amount of changes in spherical aberration of wavefront aberration to 0.07 λrms, when light source wavelength λ is changed by 10 nm.

It is preferable for the optical pickup device described in Item 24 that controlling of chromatic aberration of a light convergence spot in the case of a change in a light source wavelength to a range necessary for recording and/or reproducing of information means controlling wavefront aberration to 0.02 λrms or less at the best image position before the change when light source wavelength λ is changed by 1 nm.

It is preferable for the optical pickup device described in Item 25 that controlling of spherical aberration deteriorated by temperature changes to a range necessary for recording and/or reproducing of information means controlling an amount of changes in spherical aberration of wavefront aberration to 0.04 λrms or less, when a temperature is changed by 30° C. Incidentally, λ represents a light source wavelength for an incident light flux, in the present specification.

It is preferable for the optical pickup device described in Item 26 that the following expression is satisfied when NA1 represents a numerical aperture of the light-converging optical element closer to an image necessary for conducting recording and/or reproducing of information for the first optical information recording medium.

$$0.63 \leq NA1 \leq 0.67 \tag{11}$$

It is preferable for the optical pickup device described in Item 27 that the following expression is satisfied when NA2 represents a numerical aperture of the light-converging optical element closer to an image necessary for conducting recording and/or reproducing of information for the second optical information recording medium.

$$0.63 \leq NA2 \leq 0.67 \tag{12}$$

It is preferable for the optical pickup device described in Item 28 that the following expression is satisfied when Δλ1/ΔT represents fluctuations of a wavelength for the temperature of the first light source.

$$0.03 \text{ nm} \leq \Delta\lambda1/\Delta T \leq 0.1 \text{ nm} \tag{13}$$

It is preferable for the optical pickup device described in Item 29 that the following expression is satisfied when Δλ2/ΔT represents fluctuations of a wavelength for the temperature of the second light source.

$$0.15 \text{ nm} \leq \Delta\lambda2/\Delta T \leq 0.25 \text{ nm} \tag{14}$$

It is possible for the optical pickup device described in Item 30 to conduct recording/reproducing of information even for CD in addition to high density DVD and conventional DVD, if the optical pickup device has a third light source with wavelength λ3 (750 nm<λ3<800 nm) and if the light-converging optical system can conduct recording and/or reproducing of information by converging a divergent light flux emitted from the third light source on an information recording surface of the third optical information recording medium through a t3-thick protective layer.

It is preferable for the optical pickup device described in Item 31 that optical system magnification mo of the light-converging optical element for an incident light flux with wavelength λ3 satisfies the following expression.

$$-1/12 < mo < -1/14 \tag{15}$$

It is preferable for the optical pickup device described in Item 32 that the optical pickup device has a third light source with wavelength λ3 (750 nm<λ3<800 nm), the light-converging optical system can conduct recording and/or reproducing of information by converging a divergent light flux emitted from the third light source on an information recording surface of the third optical information recording medium through a t3-thick protective layer, and a diffraction efficiency of the (3m/2)-th order (3m/2 is an integer) diffracted light is higher than that of the other order diffracted light generated, when the light flux emitted from the third light source passes.

It is preferable for the optical pickup device described in Item 33 that optical system magnification mo of the light-converging optical element for an incident light flux with wavelength λ3 satisfies the following expression.

$$-1/12 < mo < -1/14 \tag{16}$$

It is preferable for the optical pickup device described in Item 34 that the optical pickup device has a third light source with wavelength λ3 (750 nm<λ3<800 nm), the light-converging optical system can conduct recording and/or reproducing of information by converging a divergent light flux emitted from the third light source on an information recording surface of the third optical information recording medium through a t3-thick protective layer, and a diffraction efficiency of n-th order diffracted light is higher than that of the other order diffracted light generated, when the light flux emitted from the third light source passes.

It is preferable for the optical pickup device described in Item 35 that optical system magnification mo of the light-converging optical element for an incident light flux with wavelength λ3 satisfies the following expression.

$$-1/12 < mo < -1/14 \tag{17}$$

It is preferable for the optical pickup device described in Item 36 that the optical pickup device has a third light source with wavelength λ3 (750 nm<λ3<800 nm), the light-converging optical system can conduct recording and/or reproducing of information by converging a divergent light flux emitted from the third light source on an information recording surface of the third optical information recording medium through a t3-thick protective layer, and a diffraction efficiency of n-th order diffracted light is higher than that of the other order diffracted light generated, when the light flux emitted from the third light source passes.

It is preferable for the optical pickup device described in Item 37 that the second light source and the third light source are arranged to be equal each other in terms of a distance from the light-converging optical element on the optical axis. Incidentally, "being arranged to be equal each other in terms of a distance from the light-converging optical element on the optical axis" means a situation wherein the second light source and the third light source both representing a semiconductor laser such as, for example, a two-laser in one package, are arranged on the same base board that is perpendicular to the optical axis.

It is preferable for the optical pickup device described in Item 38 that optical system magnification mo of the light-converging optical element for an incident light flux with wavelength λ3 satisfies the following expression.

$$-1/12 < mo < -1/14 \tag{18}$$

It is possible for the optical pickup device described in Item 39 to conduct recording/reproducing of information appropriately even for the third optical information recording medium, if the optical pickup device has, in the optical path through which a light flux emitted from the third light source only passes, a coupling lens that changes a diverging angle or a converging angle of a light flux emitted from the third light source.

The optical pickup device described in Item 40 is represented by an optical pickup device that has therein a first light source having wavelength λ1 (380 nm<λ1<450 nm) and a light-converging optical system, and the light-converging optical system is provided with a light-converging optical element having the diffractive structure and a correction element arranged between the first light source and the light-converging optical element, and the light-converging optical system can conduct recording and/or reproducing of information by converging a light flux emitted from the first light source on an information recording surface of the first optical information recording medium through a t1-thick protective layer, wherein spherical aberration deteriorated by wavelength changes in the first light source and spherical aberration deteriorated by temperature changes are controlled to be in a range necessary for recording and/or reproducing of information on the first spot formed on the information recording surface of the first optical information recording medium, thus, recording/reproducing of information can be conducted appropriately for high density DVD to take an illustration.

It is preferable for the optical pickup device described in Item 41 that the light-converging optical element includes a light-converging optical element for converging a light flux emitted from the first light source, a diffractive structure is formed on a part of at least one optical surface of the light-converging optical element, and the following expression is satisfied when $K_{BOL}$ represents a order of the diffracted light wherein the diffraction efficiency becomes maximum when a light flux emitted from the first light source passes through a diffractive structure of the light-converging optical element, and $n_{BOL}$ represents the number of ring-shaped zones of the diffractive structure of the light-converging optical element.

$$90 < n_{BOL} \cdot K_{BOL} < 130 \tag{19}$$

It is preferable for the optical pickup device described in Item 42 that a diffractive structure is formed on a part of at least one optical surface of the correction element, and the following expression is satisfied when $K_{COL}$ represents a order of the diffracted light wherein the diffraction efficiency becomes maximum when a light flux emitted from the first light source passes through a diffractive structure of the correction element, and $n_{COL}$ represents the number of ring-shaped zones of the diffractive structure of the correction element.

$$30 < n_{COL} \cdot K_{COL} < 130 \tag{20}$$

It is preferable for the optical pickup device described in Item 43 that chromatic aberration of a light convergence spot caused by changes in a light source wavelength is controlled to be in a range necessary for recording and/or reproducing of information, on the first spot formed on an information recording surface of the first optical information recording medium.

It is preferable for the optical pickup device described in Item 44 that the following expression is satisfied by thickness t1 of a protective layer of the first optical information recording medium.

$$0.5 \text{ mm} \leq t1 \leq 0.7 \text{ mm} \tag{21}$$

It is preferable for the optical pickup device described in Item 45 that the following expression is satisfied by focal length f1 of the light-converging optical element concerning a light flux emitted from the first light source.

$$1.8 \text{ mm} \leq f1 \leq 3.0 \text{ mm} \tag{22}$$

It is preferable for the optical pickup device described in Item 46 that the following expression is satisfied by magnification mt of an optical system wherein the light-converging optical element and the correction element are combined.

$$-1/5 \leq mt \leq -1/10 \tag{23}$$

It is preferable for the optical pickup device described in Item 47 that controlling of spherical aberration deteriorated by fluctuations of the light source wavelength to be in a range necessary for recording and/or reproducing of information means controlling of an amount of changes in spherical aberration of wavefront aberration to be 0.07 λrms or less when light source wavelength λ is changed by 10 nm.

It is preferable for the optical pickup device described in Item 48 that controlling of chromatic aberration of a light convergence spot in the case of a change of a light source wavelength means controlling of wavefront aberration to 0.02 λrms or less on the best image position before the change when light source wavelength λ is changed by 1 nm.

It is preferable for the optical pickup device described in Item 49 that controlling of spherical aberration deteriorated by the temperature changes to be in a range for recording and/or reproducing of information means controlling of an amount of changes in spherical aberration of wavefront aberration to 0.04 λrms or less when the temperature is changed by 30° C.

It is preferable for the optical pickup device described in Item 50 that the following expression is satisfied when NA1 represents a numerical aperture of the light-converging optical element closer to an image necessary for conducting recording and/or reproducing of information for the first optical information recording medium.

$$0.63 \leq NA1 \leq 0.67 \tag{24}$$

It is preferable for the optical pickup device described in Item 51 that the following expression is satisfied by wavelength fluctuation Δλ/ΔT for the temperature in the first light source.

$$0.03 \text{ nm} \leq \Delta\lambda1/\Delta T \leq 0.1 \text{ nm} \tag{25}$$

The optical pickup device described in Item 52 is characterized to be used in the optical pickup device described in either one of Items 1-51.

The correction element described in Item 53 is characterized to be used in the optical pickup device described in either one of Items 1-51.

The "diffractive structure" used in the present specification means a portion on the surface of a light-converging optical element or of a correction element where relief are provided so that the surface may have functions to converge or diverge a light flux by diffraction. AS a form of the relief, there is known a shape that is formed, on the surface of the light-converging optical element or of the correction element, as ring-shaped zones which are substantially concentric on the optical axis and each ring-shaped zone is serrated when its section is observed on a plane including an optical axis, and the shape of this kind is included, and this shape is especially called "diffractive ring-shaped zones".

When the diffractive structures are formed on two surfaces or more of the light-converging element and the correction element, the number of diffractive ring-shaped zones for expressions (3), (4), (5), . . . is the sum total of the number of ring-shaped zones of respective surfaces.

In the present specification, the light-converging optical element means a lens (for example, an objective lens) having light-converging functions arranged at the position closest to an optical information recording medium to face it under the state where the optical information recording medium is loaded on the optical pickup device, in a narrow sense, and it means a lens that can be moved together with the aforementioned lens in its optical axis direction by an actuator, in a wide sense. Accordingly, in the present specification, numerical aperture NA of the light-converging optical element closer to an optical information recording medium (closer to an image) means numerical aperture NA of the surface of the light-converging optical element located to be closest to the optical information recording medium. Further, in the present specification, necessary numerical aperture NA is assumed to show the numerical aperture stipulated by the standard of each optical information recording medium, or a numerical aperture of an objective lens having diffraction marginal performance which makes it possible to obtain a spot diameter necessary for recording or reproducing information in accordance with a wavelength of a light source to be used.

In the present specification, the first optical information recording medium means, for example, an optical disk of a high DVD type, and the second optical information recording medium includes optical disks of various DVD types such as DVD-RAM, DVD-R and DVD-RW all serving both as reproducing and recording, in addition to DVD-ROM and DVD-Video both used exclusively for reproducing. While, the third optical information recording medium means an optical disk of a CD type such as CD-R and CD-RW. Further, thickness t of a protective layer in the present specification includes also t=0.

DETAILED DESCRIPTION OF THE PREFERRED EMBODIMENT

Figure 1:
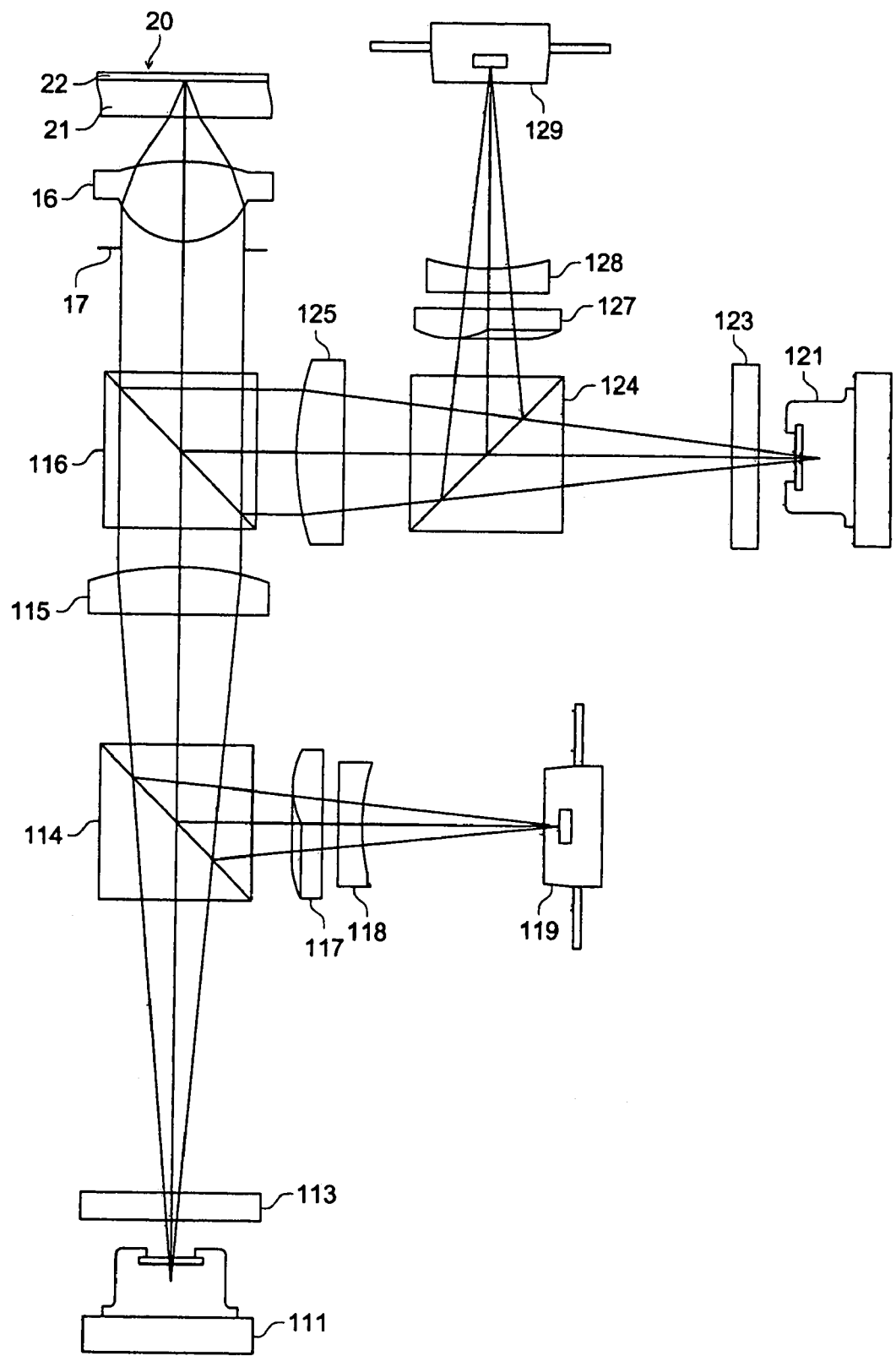
FIG. 1 is a schematic structural diagram of an optical information recording and reproducing apparatus or an optical pickup device relating to the first embodiment for two light sources.

The invention will be explained as follows in a more detailed way, referring to the drawings. FIG. 1 is a schematic structural diagram of an optical information recording and reproducing apparatus or an optical pickup device relating to the first embodiment which can conduct recording/reproducing of information for both high density DVD (which is also called the first optical disk) and conventional DVD (which is also called the second optical disk). In FIG. 1, a light flux emitted from first semiconductor laser 111 (wavelength $\lambda 1$=380 nm-450 nm) representing the first light source is transmitted through ¼ wavelength plate 113 and first beam splitter 114, then, is converted by collimator 115 representing a correction element into a parallel light flux, and further passes second beam splitter 116 to be stopped down by diaphragm 17, and is converged by objective lens 16 that serves as a light-converging optical element on information recording surface 22 through protective layer 21 (thickness t1=0.5-0.7 mm) of the first optical disk 20.

Then, the light flux modulated by information bits and reflected on the information recording surface 22 is transmitted through the objective lens 16 and diaphragm 17 again, then, passes through second beam splitter 116 and collimator 115 to enter the first beam splitter 114 where the light flux is reflected, and is given astigmatism by cylindrical lens 117, and enters photo detector 119 through concave lens 118. Thus, reading signals of information recorded on the first optical disk 20 are obtained by the use of output signals coming from the photo detector 119.

Changes in an amount of light caused by changes of a form and of a position of a spot on the photo detector 119 are detected for focusing detection and track detection. Based on this detection, a two-dimensional actuator (not shown) moves objective lens 16 so that a light flux emitted from the first semiconductor laser 111 may form an image on recording surface 22 of the first optical disk 20, and moves objective lens 16 so that a light flux emitted from the semiconductor laser 111 may form an image on a prescribed track.

On the other hand, a light flux emitted from second semiconductor laser 121 (wavelength $\lambda 2$=600 nm-700 nm) is transmitted through ¼ wavelength plate 123 and third beam splitter 124, then, is converted by collimator 125 representing a correction element into a parallel light flux, and further passes through second beam splitter 116 to be stopped down by diaphragm 17, and is converged by objective lens 16 on information recording surface 22 through protective layer 21 (thickness t2=0.5-0.7 mm) of the second optical disk 20.

Then, the light flux modulated by information bits and reflected on the information recording surface 22 is transmitted through the objective lens 16 and diaphragm 17 again, then, enters the second beam splitter 116 where the light flux is reflected, and passes through collimator 125 to enter third beam splitter 124 to be reflected further, and is given astigmatism by cylindrical lens 127, and enters photo detector 129 through concave lens 128. Thus, reading signals of information recorded on the second optical disk 20 are obtained by the use of output signals coming from the photo detector 129.

Changes in an amount of light caused by changes of a form and of a position of a spot on the photo detector 129 are detected for focusing detection and track detection. Based on this detection, a two-dimensional actuator (not shown) moves objective lens 16 so that a light flux emitted from the second semiconductor laser 121 may form an image on recording surface 22 of the second optical disk 20, and moves objective lens 16 so that a light flux emitted from the semiconductor laser 121 may form an image on a prescribed track.

Incidentally, though collimators 115 and 125 are provided respectively in an optical path between the first semiconductor laser 111 and objective lens 16 and in an optical path between the second semiconductor laser 121 and objective lens 16, in FIG. 1, it is also possible to provide a collimator equipped with a correction function in either one of the optical paths. The example which will be explained later corresponds to an occasion wherein collimator 125 (for DVD) only has a correction function, and interchangeability for high density DVD, DVD and CD is given (which means that recording/reproducing of information is made to be capable of being conducted for any one of the aforementioned optical information recording media, and so on) (Example 1), an occasion wherein collimator 115 (for high density DVD) only has a correction function, and interchangeability for high density DVD and DVD is given (Example 2), or an occasion wherein interchangeability for high density DVD, DVD and CD is given (Examples 3, 4 and 5). Incidentally, in the case of Examples 1, 3, 4 and 5, a light source and an optical path for the third optical information recording medium (CD in this case) are omitted in FIG. 1. In these cases, it is also possible to employ for the optical pickup device wherein recording/reproducing of information is not conducted for the third optical information recording medium and interchangeability is given to high density DVD and DVD.

Figure 2:
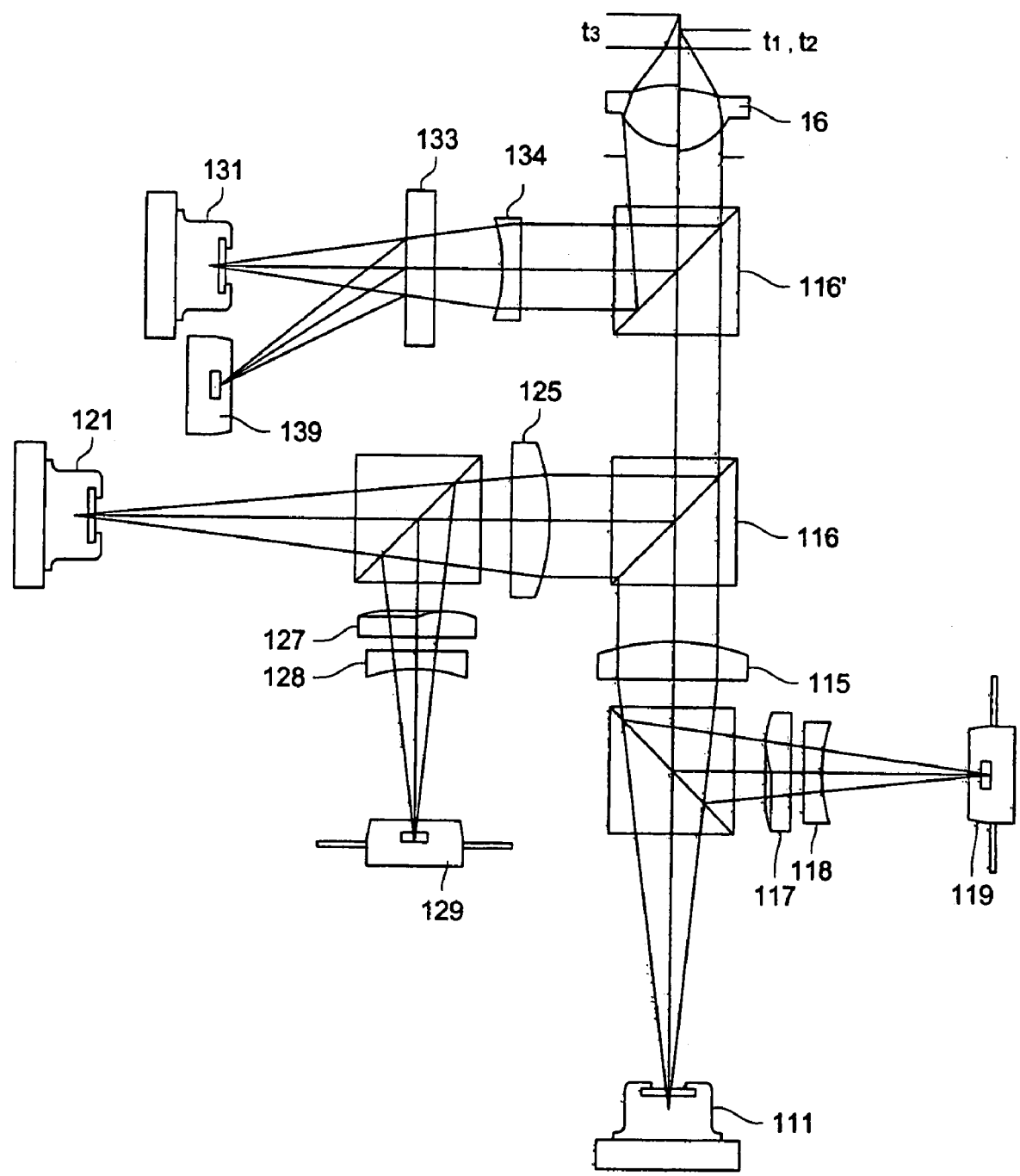
FIG. 2 is a schematic structural diagram of an optical information recording and reproducing apparatus or an optical pickup device relating to the first embodiment for three light sources.

FIG. 2 is a schematic structural diagram of an optical information recording and reproducing apparatus or an optical pickup device relating to the first embodiment for three light sources.

In FIG. 2, in addition to the structure of FIG. 1, the third semiconductor laser 131 (wavelength λ3=750 nm-800 nm), the photo detector 139, the diffractive optical element 133 and the coupling lens 134 are added for CD provided with a protective layer (thickness t3=1.2 mm).

Figure 3:
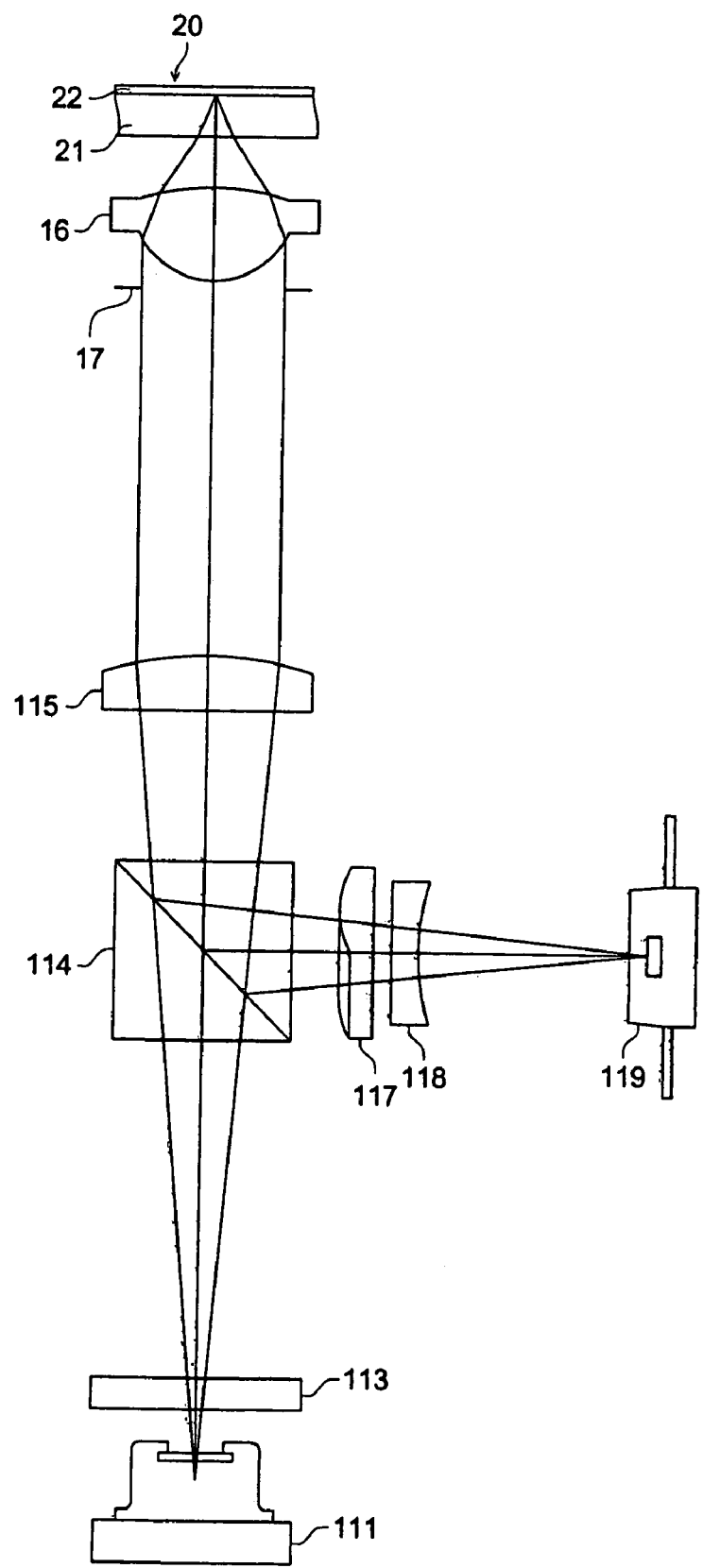
FIG. 3 is a schematic structural diagram of an optical information recording and reproducing apparatus or an optical pickup device relating to the second embodiment.

FIG. 3 is a schematic structural diagram of an optical information recording and reproducing apparatus or an optical pickup device relating to the second embodiment which can conduct recording/reproducing of information for only high density DVD. In FIG. 3, a light flux emitted from first semiconductor laser 111 (wavelength λ1=380 nm-450 nm) representing the first light source is transmitted through ¼ wavelength plate 113 and beam splitter 114, then, is converted by collimator 115 representing a correction element into a parallel light flux, and further stopped down by diaphragm 17, and is converged by objective lens 16 that serves as a light-converging optical element on information recording surface 22 through protective layer 21 (thickness t1=0.5-0.7 mm) of the first optical disk 20.

Then, the light flux modulated by information bits and reflected on the information recording surface 22 is transmitted through the objective lens 16 and diaphragm 17 again and passes through collimator 115, then, enters beam splitter 114 where the light flux is reflected, and is given astigmatism by cylindrical lens 117, and enters photo detector 119 through concave lens 118. Thus, reading signals of information recorded on the first optical disk 20 are obtained by the use of output signals coming from the photo detector 119.

Changes in an amount of light caused by changes of a form and of a position of a spot on the photo detector 119 are detected for focusing detection and track detection. Based on this detection, a two-dimensional actuator (not shown) moves objective lens 16 so that a light flux emitted from the first semiconductor laser 111 may form an image on recording surface 22 of the first optical disk 20, and moves objective lens 16 so that a light flux emitted from the semiconductor laser 111 may form an image on a prescribed track.

An example that is preferable for the aforementioned embodiment will be explained as follows.

Each of both sides of the objective lens is an aspheric surface expressed by "Numeral 1". Z represents an axis in the direction of an optical axis, h represents a height from the optical axis, r represents a paraxial radius of curvature, κ represents a constant of the cone and $A_{2i}$ represents an aspheric surface coefficient.

$$Z = \frac{(h^2/r)}{1+\sqrt{1-(1+\kappa)(h/r)^2}} + \sum_{i=1}^{9} A_i h^{Pi}$$ (Numeral 1)

Further, a diffractive structure is formed solidly on the surface of an aspheric surface of the objective lens closer to a light source. This diffractive structure is expressed by optical path difference function Φ for blazed wavelength in "Numeral 2" with a unit of mm. The secondary coefficient expresses paraxial power of the diffracting portion. Spherical aberration can be controlled by the coefficient of the order other than the secondary order, such as, for example, the fourth order coefficient or the sixth order coefficient. "Spherical aberration can be controlled" means that the spherical aberration owned by the refraction portion is corrected as a total by giving spherical aberration having opposite characteristics to the diffraction portion and spherical aberration is corrected or a flare is made to be caused by a wavelength of incident light by utilizing wavelength-dependency of the diffraction portion. In this case, spherical aberration caused by changes in temperatures is also considered to be the total of the temperature changes of spherical aberration of the refraction portion and spherical aberration of the diffraction portion.

$$\Phi = \sum_{i=1}^{\infty} c2i\, h^{2i} \text{ (mm)}$$ (Numeral 2)

EXAMPLE 1

The present example is one which is appropriate when collimator 125 representing a correction element is provided only in an optical path between the second semiconductor laser 121 and objective lens 16 in FIGS. 1 and 2 (namely, collimator 115 has no correction functions). Lens data of the optical system (objective lens+collimator) relating to the present example are shown in Tables 1 and 2. In the objective lens 16, a diffractive structure is provided on the area (that is called a common area) through which the first semiconductor laser 111 and the second semiconductor laser 121 pass and the diffractive structure is provided also on the collimator 125, which is clear from Tables 1 and 2. Incidentally, hereafter (including lens data in the Tables), a power multiplier of 10 (for example, 2.5×10⁻³) is assumed to be expressed by using E (for example, 2.5×E−3).

TABLE 1

Example 1  Lens data

Focal length of objective lens   $f_1$ = 2.4 mm   $f_2$ = 2.46 mm   $f_3$ = 2.49 mm
Numerical aperture on the image surface side  NA1: 0.65   NA2: 0.65   NA3: 0.45

| i-th surface | ri | di(407 nm) | ni(407 nm) | di(655 nm) | ni(655 nm) | di(785 nm) | ni(785 nm) |
|---|---|---|---|---|---|---|---|
| 0 | ∞ | | | 12.75 | | 33.74 | |
| 1 | −8.67751 | | | 1.5 | 1.540513 | | |
| 2 | −3.85279 | | | 5 | 1.0 | | |
| 3 *1 | ∞ | 0.1 (φ3.120 mm) | | 0.1 (φ3.192 mm) | | 0.1 (φ2.401 mm) | |
| 4 | 1.59131 | 1.60000 | 1.524609 | 1.60000 | 1.506732 | 1.60000 | 1.503453 |
| 4' | 2.16692 | 0.15126 | 1.524609 | 0.15126 | 1.506732 | 0.15126 | 1.503453 |
| 5 | −5.85891 | 1.12 | 1.0 | 1.16 | 1.0 | 1.01 | 1.0 |
| 5' | −5.51220 | 0.00000 | 1.0 | 0.00000 | 1.0 | 0.00000 | 1.0 |
| 6 | ∞ | 0.6 | 1.61869 | 0.6 | 1.57752 | 1.2 | 1.57063 |
| 7 | ∞ | | | | | | |

*1; (Diaphragm diameter)
* The symbol di shows a displacement from the i-th surface to (i + 1)th surface.
* The symbol d4' shows a displacement from the fourth surface to the 4'th surface, and the symbol d5' shows a displacement from the fifth surface to the 5'th surface.

TABLE 2

Aspheric surface data

First surface (for DVD only)

| | | | | |
|---|---|---|---|---|
| Aspheric surface coefficient | κ | −2.7276 × E−0 | | |
| | A1 | −4.5283 × E−4 | P1 | 4.0 |
| | A2 | +1.3214 × E−4 | P2 | 6.0 |
| Optical path difference function | C2 | +1.6614 × E+1 | | |
| | C4 | +3.3501 × E−0 | | |
| | C6 | +1.5629 × E−0 | | |
| | C8 | +3.2769 × E−2 | | |
| | C10 | −2.7011 × E−2 | | |

Second surface (for DVD only)

| | | | | |
|---|---|---|---|---|
| Aspheric surface coefficient | κ | −0.1000 × E−0 | | |
| | A1 | −1.4368 × E−3 | P1 | 4.0 |
| | A2 | −8.1143 × E−4 | P2 | 6.0 |

Fourth surface (0 < h < 1.56 mm: HD-DVD/DVD common area)

| | | | | |
|---|---|---|---|---|
| Aspheric surface coefficient | κ | −7.4653 × E−1 | | |
| | A1 | +8.3080 × E−3 | P1 | 4.0 |
| | A2 | −8.7702 × E−4 | P2 | 6.0 |
| | A3 | +1.3463 × E−3 | P3 | 8.0 |
| | A4 | −7.9116 × E−4 | P4 | 10.0 |
| | A5 | +2.9845 × E−4 | P5 | 12.0 |
| | A6 | −6.6527 × E−5 | P6 | 14.0 |
| Optical path difference function | C2 | −1.2851 × E−1 | | |
| | C4 | −1.8026 × E−0 | | |
| | C6 | −1.1807 × E−2 | | |
| | C8 | −1.0354 × E−1 | | |
| | C10 | +4.8953 × E−3 | | |

4'th surface (1.56 mm ≤ h: area for DVD only)

| | | | | |
|---|---|---|---|---|
| Aspheric surface coefficient | κ | −7.4653 × E−1 | | |
| | A1 | −8.3080 × E−3 | P1 | 4.0 |
| | A2 | −8.7702 × E−4 | P2 | 6.0 |
| | A3 | +1.3463 × E−3 | P3 | 8.0 |
| | A4 | −7.9116 × E−4 | P4 | 10.0 |
| | A5 | +2.9845 × E−4 | P5 | 12.0 |
| | A6 | −6.6527 × E−4 | P6 | 14.0 |
| Optical path difference function | C2 | −4.0492 × E+1 | | |
| | C4 | +1.2757 × E−0 | | |
| | C6 | +2.8435 × E−0 | | |
| | C8 | +1.0392 × E−0 | | |
| | C10 | −9.0342 × E−1 | | |

Fifth surface (0 < h < 1.287 mm)

| | | | | |
|---|---|---|---|---|
| Aspheric surface | κ | −9.6287 × E+1 | | |
| | A1 | −3.4537 × E−2 | P1 | 4.0 |

TABLE 2-continued

Aspheric surface data

| | | | | |
|---|---|---|---|---|
| coefficient | A2 | +1.2630 × E−2 | P2 | 6.0 |
| | A3 | −9.0327 × E−3 | P3 | 8.0 |
| | A4 | +2.2022 × E−3 | P4 | 10.0 |
| | A5 | −1.0621 × E−4 | P5 | 12.0 |
| | A6 | −3.1979 × E−5 | P6 | 14.0 |

5'th surface (1.287 mm ≤ h)

| | | | | |
|---|---|---|---|---|
| Aspheric surface coefficient | κ | −1.5903 × E+2 | | |
| | A1 | +8.4430 × E−4 | P1 | 4.0 |
| | A2 | +1.2839 × E−2 | P2 | 6.0 |
| | A3 | −9.6961 × E−3 | P3 | 8.0 |
| | A4 | +1.9433 × E−3 | P4 | 10.0 |
| | A5 | −8.6437 × E−5 | P5 | 12.0 |
| | A6 | −1.8294 × E−5 | P6 | 14.0 |

Specifications of the present example are as follows.
(1) Number of diffractive ring-shaped zones (primary diffraction) for objective lens common area N1: 23
(2) Number of ring-shaped zones for collimator (secondary diffraction) N2: 18
(3) Magnification of optical system on the part of high density DVD (first optical disk) mo: −1/6.
(4) Protective layer thickness t1, t2: 0.6 mm, t3: 1.2 mm
(5) Order of diffracted light by maximum diffraction efficiency by diffractive structure of objective lens common area
High density DVD: conventional DVD: CD=6:4:3
(6) Optical system magnification of objective lens for light having each wavelength
High density DVD: conventional DVD: CD=0:0:−1/12.7.
Incidentally, the light-converging optical system of the present example is appropriate when it is used for the optical pickup devices in Items 4 and 32.

EXAMPLES 2-5

Each of the present examples 2-5 is one which is appropriate when collimator 115 representing a correction element is provided only in an optical path between the first semi-conductor laser 111 and objective lens 16 in FIGS. 1 and 2 (namely, collimator 125 has no correction functions).

EXAMPLE 2

Lens data of the light-converging optical system relating to Example 2 (objective lens+collimator) are shown in Tables 3 and 4.

TABLE 3

Example 2  Lens data

Focal length of objective lens  $f_1$ = 2.4 mm  $f_2$ = 2.46 mm
Numerical aperture on the image surface side NA1: 0.65  NA2: 0.65

| i-th surface | ri | di(407 nm) | ni(407 nm) | di(655 nm) | ni(655 nm) | |
|---|---|---|---|---|---|---|
| 0 |  | 12.79 |  | ∞ |  |  |
| 1 | −8.3107 | 1.5 | 1.542771 |  |  |  |
| 2 | −4.7378 | 5.1 | 1.0 |  |  |  |
| 3 | ∞ | 0.0 | 1.0 | 0.0 | 1.0 | Diaphragm diameter φ3.192 mm |
| 4 | 1.54227 | 1.60000 | 1.542771 | 1.60000 | 1.52915 |  |
| 4' | 2.09495 | 0.15126 | 1.542771 | 0.15126 | 1.52915 |  |
| 5 | −5.85469 | 1.14000 | 1.0 | 1.07000 | 1.0 |  |
| 6 | ∞ | 0.6 | 1.61869 | 0.6 | 1.57752 |  |
| 7 | ∞ |  |  |  |  |  |

\* The symbol di shows a displacement from the i-th surface to (i + 1)th surface.
The symbol d4' shows a displacement from the fourth surface to 4'th surface.

TABLE 4

Aspheric surface data

First surface (for HD-DVD only)

| | | | | |
|---|---|---|---|---|
| Aspheric surface coefficient | κ | +3.5236 × E−0 | | |
| | A1 | −7.4347 × E−4 | P1 | 4.0 |
| | A2 | −1.1113 × E−3 | P2 | 6.0 |
| Optical path difference function | C2 | −1.7730 × E+1 | | |
| | C4 | +1.6436 × E−0 | | |
| | C6 | −1.2341 × E−0 | | |
| | C8 | +5.5958 × E−2 | | |
| | C10 | +5.8919 × E−2 | | |

Second surface (for HD-DVD only)

| | | | | |
|---|---|---|---|---|
| Aspheric surface coefficient | κ | +2.9191 × E−0 | | |
| | A1 | +2.1252 × E−3 | P1 | 4.0 |
| | A2 | +3.1469 × E−4 | P2 | 6.0 |

Fourth surface (0 < h < 1.56 mm: HD-DVD/DVD common area)

| | | | | |
|---|---|---|---|---|
| Aspheric surface coefficient | κ | −7.6953 × E−1 | | |
| | A1 | +8.4000 × E−3 | P1 | 4.0 |
| | A2 | −9.2000 × E−4 | P2 | 6.0 |
| | A3 | +1.6657 × E−3 | P3 | 8.0 |
| | A4 | −7.3116 × E−4 | P4 | 10.0 |
| | A5 | +2.3051 × E−4 | P5 | 12.0 |
| | A6 | −5.7188 × E−5 | P6 | 14.0 |
| Optical path difference function | C2 | −2.6573 × E−0 | | |
| | C4 | −1.0803 × E−0 | | |
| | C6 | −2.5559 × E−1 | | |
| | C8 | +8.6007 × E−2 | | |
| | C10 | −2.9751 × E−2 | | |

4'th surface (1.56 mm ≤ h: area for DVD only)

| | | | | |
|---|---|---|---|---|
| Aspheric surface coefficient | κ | −4.0617 × E−0 | | |
| | A1 | −5.2846 × E−3 | P1 | 4.0 |
| | A2 | +6.8538 × E−3 | P2 | 6.0 |
| | A3 | +2.5685 × E−2 | P3 | 8.0 |
| | A4 | +7.6026 × E−3 | P4 | 10.0 |
| | A5 | −5.6376 × E−4 | P5 | 12.0 |
| | A6 | +1.9688 × E−4 | P6 | 14.0 |
| Optical path difference function | C2 | −3.5650 × E+1 | | |
| | C4 | +6.2611 × E−0 | | |
| | C6 | +3.8905 × E−0 | | |
| | C8 | +1.1623 × E−0 | | |
| | C10 | −9.3398 × E−1 | | |

TABLE 4-continued

Aspheric surface data

Fifth surface

| | | | | |
|---|---|---|---|---|
| Aspheric surface coefficient | κ | −7.5809 × E+1 | | |
| | A1 | −2.8052 × E−3 | P1 | 4.0 |
| | A2 | +1.3670 × E−2 | P2 | 6.0 |
| | A3 | −9.5656 × E−3 | P3 | 8.0 |
| | A4 | +1.7676 × E−3 | P4 | 10.0 |
| | A5 | +2.9457 × E−4 | P5 | 12.0 |
| | A6 | −1.1557 × E−4 | P6 | 14.0 |

Specifications of the present example are as follows.

(7) (1) Number of diffractive ring-shaped zones (primary diffraction) for objective lens common area N1: 16

(8) (2) Number of ring-shaped zones for collimator (secondary diffraction) N2: 18

(9) (3) Magnification of optical system on the part of high density DVD (first optical disk) mo: −1/6

(10) (4) Protective layer thickness t1, t2: 0.6 mm,

(11) (5) Order of diffracted light by maximum diffraction efficiency by diffractive structure of objective lens common area High density DVD: conventional DVD 3:2

(12) (6) Optical system magnification of objective lens for light having each wavelength High density DVD: conventional DVD 0:0

Incidentally, the light-converging optical system of the present example is appropriate when it is used for the optical pickup devices in Items 4 and 12.

EXAMPLE 3

The present example is also appropriate for the optical pickup device shown in FIG. 3. Lens data of the light-converging optical system relating to the present example (objective lens+collimator) are shown in Table 5.

TABLE 5

Example 3   Lens data

Focal length of objective lens  $f_1$ = 2.4 mm  $f_2$ = 2.4 mm  $f_2$ = 2.5 mm
Numerical aperture on the image surface side NA1: 0.65  NA2: 0.65  NA2: 0.45

| i-th surface | ri | di(407 nm) | ni(407 nm) | di(655 nm) | ni(655 nm) | di(785 nm) | ni(785 nm) |
|---|---|---|---|---|---|---|---|
| 0 |  | 14.15 |  | 12.65 |  | 35.30 |  |
| 1 | 37.65302 | 1.50 | 1.542771 |  |  |  |  |
| 2 | −3.06488 | 5.00 | 1.00 |  |  |  |  |
| 3 *1 | ∞ | 0.1 |  | 0.1 |  | 0.1 |  |
|  |  | (φ3.120 mm) |  | (φ3.123 mm) |  | (φ2.405 mm) |  |
| 4 | 1.94029 | 1.60 | 1.524609 | 1.60 | 1.506732 | 1.60 | 1.503453 |
| 5 | −19.05844 | 1.02 | 1.0 | 1.00 | 1.0 | 0.90 | 1.0 |
| 6 | ∞ | 0.60 | 1.61869 | 0.60 | 1.57752 | 1.20 | 1.57063 |
| 7 | ∞ |  |  |  |  |  |  |

*1; (Diaphragm diameter)
* The symbol di shows a displacement from the i-th surface to (i + 1)th surface.

Aspheric surface data

First surface (for HD-DVD only)

| Aspheric surface coefficient | κ | −2.0527 × E−1 |  |  |
|---|---|---|---|---|
|  | A1 | +1.2177 × E−2 | P1 | 4.0 |
|  | A2 | −1.4618 × E−4 | P2 | 6.0 |

Second surface (for HD-DVD only)

| Aspheric surface coefficient | κ | −1.0874 × E−1 |  |  |
|---|---|---|---|---|
|  | A1 | +9.5823 × E−3 | P1 | 4.0 |
|  | A2 | +7.0554 × E−4 | P2 | 6.0 |
| Optical path difference function | C2 | +1.4605 × E+2 |  |  |
|  | C4 | +5.9202 × E−0 |  |  |
|  | C6 | +3.1566 × E−0 |  |  |

Fourth surface

| Aspheric surface coefficient | κ | −7.6390 × E−1 |  |  |
|---|---|---|---|---|
|  | A1 | +5.7888 × E−3 | P1 | 4.0 |
|  | A2 | +5.9520 × E−4 | P2 | 6.0 |
|  | A3 | +9.0951 × E−4 | P3 | 8.0 |
|  | A4 | −9.9238 × E−4 | P4 | 10.0 |
|  | A5 | +4.0468 × E−4 | P5 | 12.0 |
|  | A6 | −7.5725 × E−5 | P6 | 14.0 |
| Optical path difference function | C2 | −2.6687 × E+1 |  |  |
|  | C4 | −1.6322 × E−0 |  |  |
|  | C6 | +5.5099 × E−2 |  |  |
|  | C8 | −1.0644 × E−0 |  |  |
|  | C10 | +1.3015 × E−2 |  |  |

Fifth surface

| Aspheric surface coefficient | κ | −4.5835 × E+2 |  |  |
|---|---|---|---|---|
|  | A1 | +1.8084 × E−2 | P1 | 4.0 |
|  | A2 | −4.3442 × E−3 | P2 | 6.0 |
|  | A3 | −4.5714 × E−3 | P3 | 8.0 |
|  | A4 | +4.1244 × E−3 | P4 | 10.0 |
|  | A5 | −2.4595 × E−3 | P5 | 12.0 |
|  | A6 | +5.7937 × E−4 | P6 | 14.0 |

Specifications of the present example are as follows.

(13) (1) Number of diffractive ring-shaped zones (primary diffraction) for objective lens common area N1: 81

(14) (2) Number of ring-shaped zones for collimator (primary diffraction) N2: 366

(15) (3) Magnification of optical system on the part of the first optical disk mo: −1/6

(16) (4) Protective layer thickness t1, t2: 0.6 mm, t: 1.2 mm

(17) (5) Order of diffracted light by maximum diffraction efficiency by diffractive structure of objective lens common area High density DVD: conventional DVD: CD 6:4:3

(18) (6) Optical system magnification of objective lens for light having each wavelength.

High density DVD: conventional DVD: CD 0:0:−1/13.2

Incidentally, the light-converging optical system of the present example is appropriate when it is used for the optical pickup devices in Items 4 and 32.

EXAMPLE 4

The present example is appropriate for the optical pickup device shown in FIG. 3. Lens data of the light-converging optical system relating to the present example (objective lens+collimator) are shown in Table 6.

TABLE 6

Example 4   Lens data

Focal length of objective lens  $f_1$ = 2.4 mm  $f_2$ = 2.45 mm  $f_2$ = 2.50 mm
Numerical aperture on the image surface side NA1: 0.65  NA2: 0.65  NA2: 0.45

| i-th surface | ri | di(407 nm) | ni(407 nm) | di(655 nm) | ni(655 nm) | di(785 nm) | ni(785 nm) |
|---|---|---|---|---|---|---|---|
| 0 |  | 14.15 |  | 827.00 |  | 36.16 |  |
| 1 | 37.65302 | 1.50 | 1.542771 |  |  |  |  |
| 2 | −3.06488 | 5.00 | 1.00 |  |  |  |  |
| 3 *1 | ∞ | 0.1 |  | 0.1 |  | 0.1 |  |
|  |  | (φ3.120 mm) |  | (φ3.198 mm) |  | (φ2.403 mm) |  |

TABLE 6-continued

| | | | | | | | |
|---|---|---|---|---|---|---|---|
| 4 | 1.92291 | 1.60 | 1.524609 | 1.60 | 1.506732 | 1.60 | 1.503453 |
| 5 | −19.08099 | 1.02 | 1.0 | 1.06 | 1.0 | 0.89 | 1.0 |
| 6 | ∞ | 0.60 | 1.61869 | 0.60 | 1.57752 | 1.20 | 1.57063 |
| 7 | ∞ | | | | | | |

*1; (Diaphragm diameter)
* The symbol di shows a displacement from the i-th surface to (i + 1)th surface.

Aspheric surface data

First surface (for HD-DVD only)

| Aspheric surface coefficient | κ | −2.0527 × E−1 | | |
|---|---|---|---|---|
| | A1 | +1.2177 × E−2 | P1 | 4.0 |
| | A2 | −1.4618 × E−4 | P2 | 6.0 |

Second surface (for HD-DVD only)

| Aspheric surface coefficient | κ | −1.0874 × E−1 | | |
|---|---|---|---|---|
| | A1 | +9.5823 × E−3 | P1 | 4.0 |
| | A2 | +7.0554 × E−4 | P2 | 6.0 |
| Optical path difference function | C2 | +1.4605 × E+2 | | |
| | C4 | +5.9202 × E−0 | | |
| | C6 | +3.1566 × E−0 | | |

Fourth surface

| Aspheric surface coefficient | κ | −7.9792 × E−1 | | |
|---|---|---|---|---|
| | A1 | +4.9330 × E−3 | P1 | 4.0 |
| | A2 | +7.0747 × E−4 | P2 | 6.0 |
| | A3 | +9.4490 × E−4 | P3 | 8.0 |
| | A4 | −1.0691 × E−3 | P4 | 10.0 |
| | A5 | +4.1435 × E−4 | P5 | 12.0 |
| | A6 | −7.3960 × E−5 | P6 | 14.0 |
| Optical path difference function | C2 | −1.9643 × E+1 | | |
| | C4 | −1.5085 × E−0 | | |
| | C6 | +1.0855 × E−1 | | |
| | C8 | −1.0371 × E−1 | | |
| | C10 | +1.3735 × E−2 | | |

Fifth surface

| Aspheric surface coefficient | κ | −5.2563 × E+2 | | |
|---|---|---|---|---|
| | A1 | +1.7853 × E−2 | P1 | 4.0 |
| | A2 | −4.7662 × E−3 | P2 | 6.0 |
| | A3 | −4.9002 × E−3 | P3 | 8.0 |
| | A4 | +4.0691 × E−3 | P4 | 10.0 |
| | A5 | −1.9875 × E−3 | P5 | 12.0 |
| | A6 | +3.9475 × E−4 | P6 | 14.0 |

Specifications of the present example are as follows.
(19) (1) Number of diffractive ring-shaped zones (primary diffraction) for objective lens common area N1: 81
(20) (2) Number of ring-shaped zones for collimator. (primary diffraction) N2: 1
(21) (3) Magnification of optical system on the part of the first optical disk mo: −1/6
(22) (4) Protective layer thickness t1, t2: 0.6 mm, t3: 1.2 mm
(23) (5) Order of diffracted light by maximum diffraction efficiency by diffractive structure of: objective lens common area
High density DVD: conventional DVD: CD=2:1:1
(24) (6) Optical system magnification of objective lens for light having each wavelength
High density DVD: conventional DVD: CD=0:−1/13.1:−1/13.0

Incidentally, the light-converging optical system of the present example is appropriate when it is used for the optical pickup devices in Items 3 and 36.

EXAMPLE 5

The light-converging optical system of the present example is appropriate for the optical pickup devices of Items 5 and 34. Lens data of the light-converging optical system relating to the present example (objective lens+ collimator) are shown in Table 7.

TABLE 7

Example 5  Lens data

Focal length of objective lens $f_1$ = 2.4 mm  $f_2$ = 2.4 mm  $f_2$ = 2.49 mm
Numerical aperture on the image surface side NA1: 0.65  NA2: 0.65  NA2: 0.45

| i-th surface | ri | di(407 nm) | ni(407 nm) | di(655 nm) | ni(655 nm) | di(785 nm) | ni(785 nm) |
|---|---|---|---|---|---|---|---|
| 0 | | 13.45 | | 12.75 | | 34.74 | |
| 1 | 1643.88 | 1.50 | 1.542771 | | | | |
| 2 | −9.1285 | 5.10 | 1.0 | | | | |
| 3 *1 | ∞ | 0.1 | | 0.1 | | 0.1 | |
| | | (φ3.120 mm) | | (φ3.452 mm) | | (φ2.392 mm) | |
| 4 | 1.54056 | 1.70 | 1.524609 | 1.70 | 1.506732 | 1.70 | 1.503453 |
| 5 | −5.05826 | 1.08 | 1.0 | 1.35 | 1.0 | 1.35 | 1.0 |
| 6 | ∞ | 0.60 | 1.61869 | 0.60 | 1.57752 | 1.20 | 1.57063 |
| 7 | ∞ | | | | | | |

*1; (Diaphragm diameter)
* The symbol di shows a displacement from the i-th surface to (i + 1)th surface.

| Aspheric surface data | | | | |
|---|---|---|---|---|
| First surface (for HD-DVD only) | | | | |
| Aspheric surface coefficient | κ | −2.0527 × E−33 | | |
| | A1 | +6.1818 × E−3 | P1 | 4.0 |
| | A2 | −1.7991 × E−3 | P2 | 6.0 |
| Second surface (for HD-DVD only) | | | | |
| Aspheric surface coefficient | κ | +7.8948 × E−0 | | |
| | A1 | +5.2959 × E−3 | P1 | 4.0 |
| | A2 | −2.3710 × E−3 | P2 | 6.0 |
| Optical path difference function | C2 | −1.3131 × E+1 | | |
| | C4 | +1.4411 × E−0 | | |
| | C6 | +1.7083 × E−0 | | |
| Fourth surface | | | | |
| Aspheric surface coefficient | κ | −7.7790 × E−1 | | |
| | A1 | +5.1727 × E−3 | P1 | 4.0 |
| | A2 | +1.1101 × E−3 | P2 | 6.0 |
| | A3 | −6.4972 × E−4 | P3 | 8.0 |
| | A4 | −5.9817 × E−4 | P4 | 10.0 |
| | A5 | +3.3629 × E−4 | P5 | 12.0 |
| | A6 | −6.2531 × E−5 | P6 | 14.0 |
| Optical path difference function | C2 | −8.1974 × E−0 | | |
| | C4 | −5.7385 × E−0 | | |
| | C6 | +1.8525 × E−0 | | |
| | C8 | −1.7519 × E−0 | | |
| | C10 | +3.7926 × E−1 | | |
| Fifth surface | | | | |
| Aspheric surface coefficient | κ | −6.6494 × E+1 | | |
| | A1 | +4.7077 × E−3 | P1 | 4.0 |
| | A2 | +1.8991 × E−3 | P2 | 6.0 |
| | A3 | −4.8520 × E−3 | P3 | 8.0 |
| | A4 | +1.6255 × E−3 | P4 | 10.0 |
| | A5 | −2.4962 × E−4 | P5 | 12.0 |
| | A6 | +1.1626 × E−5 | P6 | 14.0 |

Specifications of the present example are as follows.

(25) (1) Number of diffractive ring-shaped zones (primary diffraction) for objective lens common area N1: 61

(26) (2) Number of ring-shaped zones for collimator (secondary diffraction) N2: 377

(27) (3) Magnification of optical system on the part of high density DVD (first optical disk) m: −1/6

(28) (4) Protective layer thickness t1, t2: 0.6 mm, t3: 1.2 mm

(29) (5) Order of diffracted light by maximum diffraction efficiency by diffractive structure of objective lens common area High density DVD: conventional DVD: CD=8:5:4

(30) (6) Optical system magnification of objective lens for light having each wavelength High density DVD: conventional DVD: CD=0:−1/333:−1/13.4

EXAMPLE 6

Lens data of the objective lens of the light-converging optical system relating to Example 6 are shown in Table 8, and lens data of the collimator of the light-converging optical system relating to Example 6 are shown in Table 9. Incidentally, the light-converging optical system in Example 6 and in Example 7 which will be described later is one that can be used in the optical pickup device shown in FIG. 3.

TABLE 8

| Example 6 | Lens data | | Objective lens 1 |
|---|---|---|---|
| f1 = 2.4 mm | | | |
| NA: 0.65 | | | |
| i-th surface | ri | di | ni(405 nm) |
| 0 | ∞ | ∞ | |
| 1 | ∞ | 0.0 | 1.0 Diaphragm diameter φ3.22 mm |
| 2 | 1.45460 | 1.50000 | 1.52461 |
| 3 | −6.04260 | 1.17774 | 1.0 |
| 4 | ∞ | 0.6 | 1.62 |
| 5 | ∞ | | |

\* The symbol di shows a displacement from the i-th surface to (i + 1)th surface.

| Aspheric surface data | | | | |
|---|---|---|---|---|
| Second surface | | | | |
| Aspheric surface coefficient | κ | −1.9937 × E−0 | | |
| | A1 | +1.6862 × E−2 | P1 | 4.0 |
| | A2 | +2.4659 × E−2 | P2 | 6.0 |
| | A3 | −8.4628 × E−3 | P3 | 8.0 |
| | A4 | −2.6596 × E−4 | P4 | 10.0 |
| | A5 | +2.7611 × E−4 | P5 | 12.0 |
| | A6 | −3.5091 × E−5 | P6 | 14.0 |
| *1 | C4 | −5.6672 × E+1 | | |
| | C6 | +4.5666 × E+1 | | |
| | C8 | −1.8280 × E+1 | | |
| | C10 | +2.5654 × E−0 | | |
| Third surface | | | | |
| Aspheric surface coefficient | κ | +5.0000 × E+1 | | |
| | A1 | +1.0025 × E−2 | P1 | 4.0 |
| | A2 | +4.2022 × E−3 | P2 | 6.0 |
| | A3 | −6.3019 × E−3 | P3 | 8.0 |
| | A4 | +2.5320 × E−3 | P4 | 10.0 |
| | A5 | −5.4683 × E−4 | P5 | 12.0 |
| | A6 | +5.2137 × E−5 | P6 | 14.0 |

*1; Optical path difference function (Coefficient of optical path difference function: Standard wavelength 1 mm)

TABLE 9

| Example 6 | Lens data | | (Collimator 1 for Objective lens 1) |
|---|---|---|---|
| f1 = 14.4 mm | | | |
| i-th surface | ri | di | ni(405 nm) |
| 0 | ∞ | ∞ | |
| 1 | ∞ | 0.0 | 1.0 Diaphragm diameter φ3.22 mm |
| 2 | 5.42216 | 1.50000 | 1.52461 |
| 3 | 11.0102 | 13.0275 | 1.0 |
| 4 | ∞ | | 1.0 |

\* The symbol di shows a displacement from the i-th surface to (i + 1)th surface.

| Aspheric surface data | | | | |
|---|---|---|---|---|
| Second surface | | | | |
| Aspheric surface coefficient | κ | +4.5254 × E−0 | | |
| | A1 | −2.0556 × E−3 | P1 | 4.0 |
| | A2 | −8.4275 × E−4 | P2 | 6.0 |

-continued

Aspheric surface data

Third surface

| *1 | C2 | −2.1495 × E+1 |
| | C4 | +1.4345 × E−0 |
| | C6 | −1.1092 × E−0 |
| | C8 | −1.1630 × E−1 |
| | C10 | +4.7356 × E−2 |

*1; Optical path difference function (Coefficient of optical path difference function: Standard wavelength 1 mm)

Specifications of the present example are as follows.

(31) (1) Number of diffractive ring-shaped zones of objective lens (primary diffraction) N1: 100

(32) (2) Number of ring-shaped zones for collimator (primary diffraction) N2: 48

(33) (3) Magnification of optical system of combination of collimator and objective mt: −1/6

(34) (4) Protective layer thickness: 0.6 mm

EXAMPLE 7

Lens data of the collimator of the light-converging optical system relating to Example 7 are shown in Table 10. Incidentally, the objective lens in Example 6 shown in Table 8 can be used as the objective lens used together with the collimator in Example 7.

TABLE 10

| Example 7 | Lens data | | (Collimator 2 for Objective lens 1) |
| --- | --- | --- | --- |
| f1 = 14.4 mm | | | |

| i-th surface | ri | di | ni(405 nm) | |
| --- | --- | --- | --- | --- |
| 0 | ∞ | ∞ | | |
| 1 | ∞ | 0.0 | 1.0 | Diaphragm diameter φ3.22 mm |
| 2 | 5.37212 | 1.50000 | 1.52461 | |
| 3 | 11.2778 | 12.8918 | 1.0 | |
| 4 | ∞ | | 1.0 | |

* The symbol di shows a displacement from the i-th surface to (i + 1)th surface.

Aspheric surface data

Second surface

| Aspheric surface coefficient | κ | +4.3443 × E−0 | | |
| --- | --- | --- | --- | --- |
| | A1 | −2.3164 × E−3 | P1 | 4.0 |
| | A2 | −1.1874 × E−3 | P2 | 6.0 |

Third surface

| *1 | C2 | −1.8815 × E+1 |
| | C4 | +2.8757 × E−0 |
| | C6 | −1.8681 × E−0 |
| | C8 | −1.2050 × E−1 |
| | C10 | +4.5833 × E−2 |

*1; Optical path difference function (Coefficient of optical path difference function: Standard wavelength 1 mm)

Specifications of the present example are as follows.

(35) (1) Number of diffractive ring-shaped zones of objective lens (primary diffraction) N1: 100

(36) (2) Number of ring-shaped zones for collimator (primary diffraction) N2: 39

(37) (3) Magnification of optical system of combination of collimator and objective mt: −1/6

(38) (4) Protective layer thickness: 0.6 mm.

The respective wavefront aberrations of the Examples 1-7 stated above proved to be excellent as shown in Table 11.

TABLE 11

| | [λ] | First optical disk | Second optical disk |
| --- | --- | --- | --- |
| Example 1 | (1) | 0.018 | 0.003 |
| | (2) | 0.038 | 0.008 |
| | (3) | 0.028 | 0.017 |
| Example 2 | (1) | 0.013 | 0.002 |
| | (2) | 0.036 | 0.022 |
| | (3) | 0.024 | 0.010 |
| Example 3 | (1) | 0.010 | 0.128 |
| | (2) | 0.034 | 0.010 |
| | (3) | 0.005 | 0.004 |
| Example 4 | (1) | 0.008 | 0.022 |
| | (2) | 0.038 | 0.050 |
| | (3) | 0.023 | 0.045 |
| Example 5 | (1) | 0.012 | 0.127 |
| | (2) | 0.056 | 0.016 |
| | (3) | 0.013 | 0.005 |
| Example 6 | (1) | 0.004 | |
| | (2) | 0.047 | |
| | (3) | 0.022 | |
| Example 7 | (1) | 0.006 | |
| | (2) | 0.065 | |
| | (3) | 0.012 | |

Characteristics of Each Number (1) Amount of changes in wavefront aberration for wavelength change $\Delta\lambda=+1$ nm, at the best image surface position under the standard condition (2) Amount of changes in wavefront aberration for wavelength change $\Delta\lambda=+10$ nm, at the best image surface position (3) Amount of changes in wavefront aberration at the best image surface position for temperature change $\Delta T=30°$ C.

EFFECT OF THE INVENTION

The invention makes it possible to provide an optical pickup device that is of a compact structure and yet is capable of conducting recording and reproducing for information properly for high density DVD or for both high density DVD and conventional DVD, and to provide an optical system that can be used for the optical pickup device.

What is claimed is:

1. An optical pickup device, comprising:
a first light source to emit a first light flux having a wavelength λ1 (380 nm<λ1<450 nm);
a second light source to emit a second light flux having a wavelength λ2 (600 nm<λ2<700 nm); and
a collimator lens to collimate the first light flux and/or the second light flux, and
an objective lens to converge the first light flux emitted from the first light source on an information recording surface of a first optical information recording medium through a protective layer having a thickness t1 so that the optical pickup device conducts recording and/or reproducing information for the first optical information recording medium and converge the second light flux emitted from the second light source on an information recording surface of a second optical information recording medium through a protective layer having a thickness t2 so that the optical pickup device conducts recording and/or reproducing information for the second optical information recording medium, and wherein the collimator lens comprises a diffractive structure, wherein the objective lens comprises a diffractive structure, wherein the objective lens forms a first spot on the information recording surface of the first optical information recording medium by using diffracted light ray generated when the first light flux from the first light source passes through the diffractive structure of the collimator lens and/or the objective lens, and the objective lens forms the second spot on the information recording surface of the second optical information recording medium by using diffracted light ray generated when the second light flux from the second light source passes through the diffractive structure of the collimator lens and/or the objective lens.

2. The optical pickup device of claim 1, wherein t1 and t2 satisfy the following expressions $0.5 \text{ mm} \leq t1 \leq 0.7 \text{ mm}$ $0.5 \text{ mm} \leq t2 \leq 0.7 \text{ mm}$.

3. The optical pickup device of claim 1, further comprising:

a third light source to emit a third light flux having a wavelength $\lambda 3$ (750 nm<$\lambda 3$<800 nm), wherein the objective lens converges the third light flux emitted from the third light source on an information recording surface of a third optical information recording medium through a protective layer having a thickness t3 (t3>t2) so that the optical pickup device conducts recording and/or reproducing information for the third information recording medium.

4. The optical pickup device of claim 1, wherein the collimator lens is an aspheric lens.

5. The optical pickup device of claim 1, wherein the objective lens is an aspheric lens.

6. The optical pickup device of claim 1, wherein the collimator lens comprising the diffractive structure is arranged in an optical path in which the first light flux passed and the second light flux does not pass.

7. The optical pickup device of claim 1, wherein the collimator lens comprising the diffractive structure is arranged in an optical path in which the first light flux does not pass and the second light flux passes.

* * * * *